Jan. 5, 1926. 1,568,782
P. F. SWAYNE
KNUCKLE BEARING
Filed Nov. 2, 1923
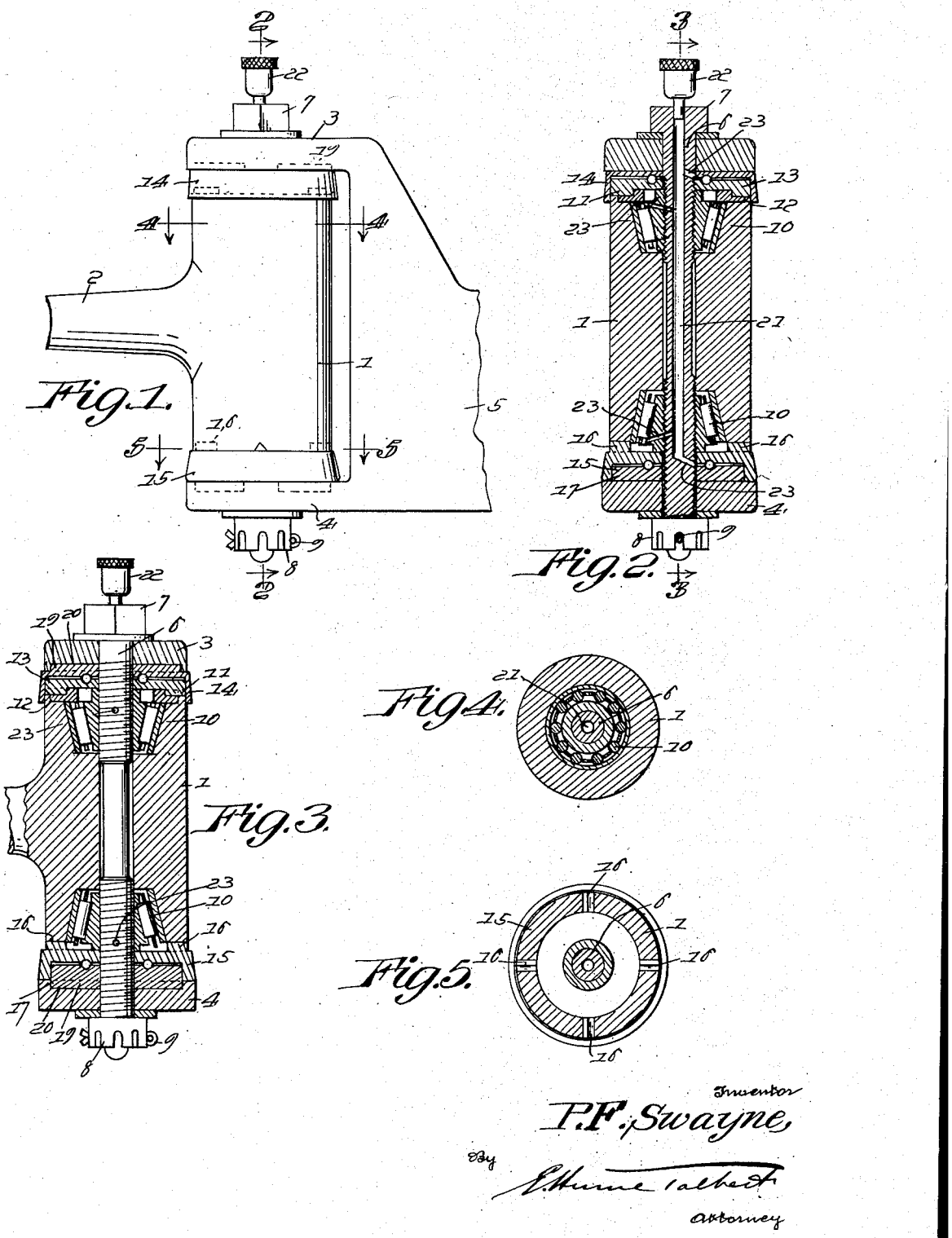

Patented Jan. 5, 1926.

1,568,782

UNITED STATES PATENT OFFICE.

PATRICK F. SWAYNE, OF JACKSONVILLE, OREGON.

KNUCKLE BEARING.

Application filed November 2, 1923. Serial No. 672,449.

*To all whom it may concern:*

Be it known that PATRICK F. SWAYNE, a citizen of the United States of America, residing at Jacksonville, in the county of Jackson and State of Oregon, has invented new and useful Improvements in Knuckle Bearings, of which the following is a specification.

The purpose of the invention is to provide a device of the kind above indicated which, while simple in construction, is durable and effective in operation and reduces to a minimum the effort necessary to effect swinging of the front wheels of a vehicle in steering the latter.

With this object in view the invention consists in a construction and combination of parts of which a preferred embodiment is shown in the accompanying drawings, wherein:—

Figure 1 is a side elevational view of a front axle knuckle embodying the invention.

Figure 2 is a central vertical sectional view on the line 2—2 of Figure 1.

Figure 3 is a view similar to Figure 2 but taken on the line 3—3 of the latter.

Figure 4 is a transverse sectional view on the line 4—4 of Figure 1.

Figure 5 is a similar view on the line 5—5 of Figure 1.

The invention embodies a cylindrical body element 1 formed preferably with the stub axle 2 by which the front wheel of the vehicle is carried, the body member being disposed between the upper and lower arms 3 and 4 of the fork at the extremity of the front axle 5. The body member is held in place between the arms of the fork by means of a pivot stud 6, the head 7 of which rests on the upper face of the top arm and the lower threaded end of which receives a castle nut 8 abutting the lower face of the bottom arm 4 and secured against turning movement when attached to the stud by means of a cotter pin 9 extending diametrically through the threaded end of the bolt and engaging in the radial grooves of the castle nut.

In order to provide for free turning movement of the body member 1 on the pivot bolt, roller bearings 10 are employed and are seated in the upper and lower ends of the body member and are threadingly engaged with the pivot bolt, a conventional form of roller bearing being employed.

In order to take the downward thrust of the forked end of the axle 5, a thrust plate 12 is mounted on the top of the body member 1 and provided with radial uniformally spaced transversely wedge shaped ribs 11 engaging in corresponding grooves formed on the under face of the lower race ring of a ball bearing 13, this bearing and the thrust plate being enclosed by a cap 14, the latter on the under face being recessed to receive the ball bearing and its flange overlapping the upper edge of the body member.

At the lower end the body member engages a cap 15 formed on its upper face with ribs 16 identical with the ribs 11 and engaging corresponding grooves formed in the lower edge of the body member, the cap 15 enclosing a thrust plate 17 and an interposed thrust ball bearing 18. The thrust plate 17 and the cap 14 are both provided, the one on the upper face and the other on the lower face, with diameterical ribs 19 engaging recesses 20 formed respectively in the under face of the upper arm 3 and upper face of the lower arm 4 and preclude turning movement of the cap 14 and thrust plate 17 in the movement of the body member which must take place in the swinging of the wheel for steering purposes. In the upper ball thrust it will be observed that the thrust plate is the rotating element and the cap the stationary element and in the lower thrust the reverse occurs, the thrust plate being stationary with respect to the axle and the cap rotating with the body member 1. Notwithstanding, however, the caps are effective in positively precluding the entrance of foreign matter to the thrust bearings and also to the roller bearings in the body member.

In order that all the bearings may be properly lubricated, however, the pivot bolt 6 is provided with a longitudinal channel 21 in communication at its upper end with a grease cup 22 for the application of lubricant to the channel, the channel having lateral outlets 23 to the upper and lower roller bearings and upper and lower thrust ball bearings. Obviously, if it is not desired to employ grease for lubricating purposes, an oil cap may take the place of the grease cup 22 for the adjustment of lubricating oil to the ball and roller bearings.

Having described the invention, what is claimed as new and useful is:—

1. A steering axle knuckle comprising, in combination with the axle fork, a body element carrying the stub shaft for the steering wheel, a pivot bolt spanning the arms of the fork and passing longitudinally through the body member, anti-friction elements interposed between the bolt and the body member and between the upper and lower ends of the latter and the arms of the fork, thrust plates disposed respectively above and below the body member, and caps enclosing the thrust plates, the anti-friction elements at the top and bottom of the body element being interposed between said caps and said thrust plates, the upper cap having an interlocking engagement with the adjacent fork arm and the lower cap an interlocking engagement with the lower end of the body member.

2. A steering axle knuckle comprising, in combination with the axle fork, a body element carrying the stub shaft for the steering wheel, a pivot bolt spanning the arms of the fork and passing longitudinally through the body member, anti-friction elements interposed between the bolt and the body member and between the upper and lower ends of the latter and the arms of the fork, thrust plates disposed respectively above and below the body member, and caps enclosing the thrust plates, the anti-friction elements at the top and bottom of the body element being interposed between said caps and said thrust plates, the upper cap having an interlocking engagement with the adjacent fork arm and the lower cap an interlocking engagement with the lower end of the body member, and the lower thrust plate having an interlocking engagement with the lower arm and the upper thrust plate an interlocking engagement with the body member.

In testimony whereof he affixes his signature.

PATRICK F. SWAYNE.